United States Patent
Heap

(10) Patent No.: US 10,324,672 B2
(45) Date of Patent: Jun. 18, 2019

(54) SYSTEMS AND METHODS FOR CONSISTENT PRINTING AMONGST DISPARATE PRINT VENDORS

(71) Applicant: Brett Heap, Newport Beach, CA (US)

(72) Inventor: Brett Heap, Newport Beach, CA (US)

(*) Notice: Subject to any disclaimer, the term of this patent is extended or adjusted under 35 U.S.C. 154(b) by 39 days.

(21) Appl. No.: 15/632,171

(22) Filed: Jun. 23, 2017

(65) Prior Publication Data

US 2018/0136887 A1 May 17, 2018

Related U.S. Application Data

(60) Provisional application No. 62/423,704, filed on Nov. 17, 2016.

(51) Int. Cl.
*G06F 3/12* (2006.01)
*G06K 15/02* (2006.01)
*G06F 11/07* (2006.01)

(52) U.S. Cl.
CPC .......... *G06F 3/1247* (2013.01); *G06F 3/1205* (2013.01); *G06F 3/126* (2013.01); *G06F 3/1226* (2013.01); *G06F 3/1287* (2013.01); *G06F 3/1288* (2013.01); *G06F 11/0787* (2013.01); *G06K 15/026* (2013.01); *G06K 15/186* (2013.01)

(58) Field of Classification Search
CPC combination set(s) only.
See application file for complete search history.

(56) References Cited

U.S. PATENT DOCUMENTS

| | | |
|---|---|---|
| 6,847,384 B1 | 1/2005 | Sabadell et al. |
| 7,370,335 B1 | 5/2008 | White et al. |
| 8,564,832 B2 | 10/2013 | Conlon |
| 8,645,248 B2 | 2/2014 | Roselli et al. |
| 8,861,005 B2 | 10/2014 | Grosz |
| 9,420,121 B2 | 8/2016 | Grosz et al. |
| 2003/0123072 A1 | 7/2003 | Spronk |
| 2004/0111302 A1 | 7/2004 | Falk et al. |
| 2005/0055476 A1 | 3/2005 | Aschenbrenner et al. |
| 2006/0031585 A1* | 2/2006 | Nielsen .................. H04L 67/12 709/246 |
| 2006/0132815 A1 | 6/2006 | Lofthus |

(Continued)

FOREIGN PATENT DOCUMENTS

WO 2015185102 12/2015

OTHER PUBLICATIONS

Ouyang, et al, 'Pattern-based Translation of BPMN Process Models to BPEL Web Services' International Journal of Web Services Research (JWSR). Copyright 2007 Idea Group Accessed from http://eprints.qut.edu.au.

*Primary Examiner* — Helen Zong
(74) *Attorney, Agent, or Firm* — Fish IP Law, LLP

(57) ABSTRACT

A system and method for consistent print product generation that converts aspects of a print job from a first print shop in a first print shop terminology to a standard terminology using a mapping scheme generated by the first print shop such that for a second print shop selected to execute the submitted print job, the standard terminology is converted to the second print shop's terminology by using a mapping scheme generated by the second print shop. The system and method of the inventive subject matter can use feedback to improve the accuracy of the mapping schemes.

7 Claims, 11 Drawing Sheets

(56) References Cited

U.S. PATENT DOCUMENTS

| | | |
|---|---|---|
| 2008/0151281 A1 | 7/2008 | Barry et al. |
| 2008/0235158 A1* | 9/2008 | Manchala ........ G06Q 10/06316 |
| | | 705/400 |
| 2012/0314230 A1 | 12/2012 | Colon |
| 2014/0085665 A1 | 3/2014 | Sheldon et al. |
| 2014/0233065 A1* | 8/2014 | Fischer ................. G06F 3/1208 |
| | | 358/1.15 |
| 2015/0199161 A1* | 7/2015 | Gutnik .................. G06F 3/1296 |
| | | 358/1.15 |
| 2016/0328789 A1 | 11/2016 | Grosz |
| 2016/0364187 A1* | 12/2016 | Tanaka .................... G06F 3/127 |
| 2017/0076346 A1* | 3/2017 | Jennings ............ G06Q 30/0621 |

\* cited by examiner

| | |
|---|---|
| PRINT | Item has completed printing |
| COAT | Item has completed full or spot UV coating |
| MAGNETIZE | Item has been magnetized |
| PLACED_ON_SHEET | Item was placed on a press sheet in pre-press |
| REMOVED_FROM_SHEET | Item was removed from a press sheet in pre-press |
| CUT | Item was cut or slit and boxed |
| SPLITTING | Item was split into two items |
| ROUND_CORNERS | Item's corners were rounded. |
| FOLD | Item was folded |
| BIN | Item was binned, awaiting shipping |
| QUALITY_CONTROL | Item was processed for quality control |
| SHIP | Item was partially shipped |
| FINAL_SHIP | Item was completely shipped |
| INTERNAL_REPRINT | Item was reprinted internally for a quality issue |
| ROUTE_RESULT | Item was routed to a provider for printing |
| CANCELED | Item was canceled by print provider |
| CONTAINER_PACKING | |
| INSPECTION | |
| LABEL_PRINTING | |
| LAMINATING | |
| SHIP_LABEL | |

Figure 9

SYSTEMS AND METHODS FOR CONSISTENT PRINTING AMONGST DISPARATE PRINT VENDORS

This application claims priority to U.S. provisional application 62/423,704, filed Nov. 17, 2016. U.S. provisional application 62/423,704 and all other extrinsic references contained herein are incorporated by reference in their entirety.

FIELD OF THE INVENTION

The field of the invention is printing technologies.

BACKGROUND

The background description includes information that may be useful in understanding the present invention. It is not an admission that any of the information provided herein is prior art or relevant to the presently claimed invention, or that any publication specifically or implicitly referenced is prior art.

Print shops have traditionally served the local community in which they've been located. This relative isolation allowed print shops to tailor their services and capabilities to the needs of that particular community. With that, the terminology of a print shop's offerings evolved to fit those products and services. The printing options and capabilities available to a community were limited to those that a local print shop could provide. Conversely, the available market of a print shop was limited to the local community. The development of modern data communications enabled print shops to offer expanded capabilities to their local and internet customers by being able to delegate some or all of a print job to other print shops. Similarly, print shops could expand their potential for business by taking on print jobs from other print shops in other communities needing to reach out to meet their demands.

Delegating print jobs to other shops created a new problem: an inconsistency of the printed product executed by other print shops. Because of the individual, unique terminology used by the isolated of community print shop and their customers, print shops have struggled to accurately communicate to other shops how to properly execute the print job, and as such, the print shops executing the print jobs have struggled to produce an output of printed product that accurately reflects the submitted order by the original customer at an acceptable quality. Consequently, customers used to a certain product resulting from a submitted order may end up getting print product of a quality that is different than they are used to from their usual print shop, thus damaging the reputation of their "regular" print shop. Middle-man systems to match print shops looking to outsource their work with those willing to handle the outsourced work use static standards that do not allow the individual print shops to accurately submit or reproduce print jobs.

Furthermore, the delivery of the product with either or both print shops' names attached to them is confusing to customers as to who is actually responsible for the quality of the product they receive (in either positive or negative quality scenarios).

Others have attempted to address this discrepancy. US 2016/0328789 to Grosz, US 2006/0132815 to Lofthus, and US 2006/0031585 to Nielsen all attempt to tackle the inconsistencies of a print job distributed amongst different printers. However, none of them address inconsistencies arising from the disparate terminology used by individual shops to ensure a quality, consistent output by print shops selected to execute some or all of a print job originated by a requesting print shop.

Thus, there is still a need for a system of ensuring a consistent generation of a printed product even where the terminology between a requesting print shop and an executing print shop are distinct. There is also a need for a system that allows for the correction of terminology interpretation so as to allow print shops to increase the likelihood that their terminology will be properly applied in the submission and/or execution of print jobs that they respectively create or receive for execution.

SUMMARY OF THE INVENTION

The inventive subject matter provides apparatus, systems and methods in which one or more central servers converts one or more physical job attributes of a print job associated with a customer and received from an originating print shop in the terminology used by the originating print shop into a standard terminology, based on a self-mapping scheme created by the originating print shop. The central server can then select, based on logistics job attributes, one or more executing print shops to execute the print job.

Based on the selection, the server(s) convert the standard terminology to the terminology used by the executing print shop based on a self-mapping scheme generated by the executing print shop, such that the physical job attributes from the original print job are now in the terminology of the executing print shop.

The server directs the executing print shop to carry out the execution of the print job, and the executing print shop then executes the print job. The executed print job is delivered to the customer. The server receives feedback from the customer and the server is programmed to, based on the feedback, provide recommendations or feedback to one or more of the originating print shop and executing print shop to adjust their respective mapping schemes to improve future output.

In embodiments, the executed print job is sent (i.e., shipped or otherwise delivered) to the customer with the logos or other identifying information of a clearinghouse (which can be the operating entity of the central server(s)), and no identifying information of either the originating print shop or the executing print shop.

In embodiments, the server selects the executing print shop based on physical job attributes designated as fixed attributes as a minimum threshold for selection, and also any optional attributes designated in a print job submitted by a requesting print shop.

The system can include an interface that allows an operator at a print shop to create or generate the mapping scheme for that print shop. The mapping scheme can be generated by the operator by submitting the print shop's own terminology and select or otherwise correlate it with one or more of the standard terminology terms.

Various objects, features, aspects and advantages of the inventive subject matter will become more apparent from the following detailed description of preferred embodiments, along with the accompanying drawing figures in which like numerals represent like components.

US 2016/0328789 to Grosz, US 2006/0132815 to Lofthus, US 2006/0031585 to Nielsen, and all other publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

BRIEF DESCRIPTION OF THE DRAWING

FIG. 9 provides an example of update events according to embodiments of the inventive subject matter.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The systems and methods of the inventive subject matter enable a print job or order provided by a requesting print shop to be executed by an executing print shop wherein the terminology used by each print shop to describe the characteristics of a print job are different.

Figure 1:
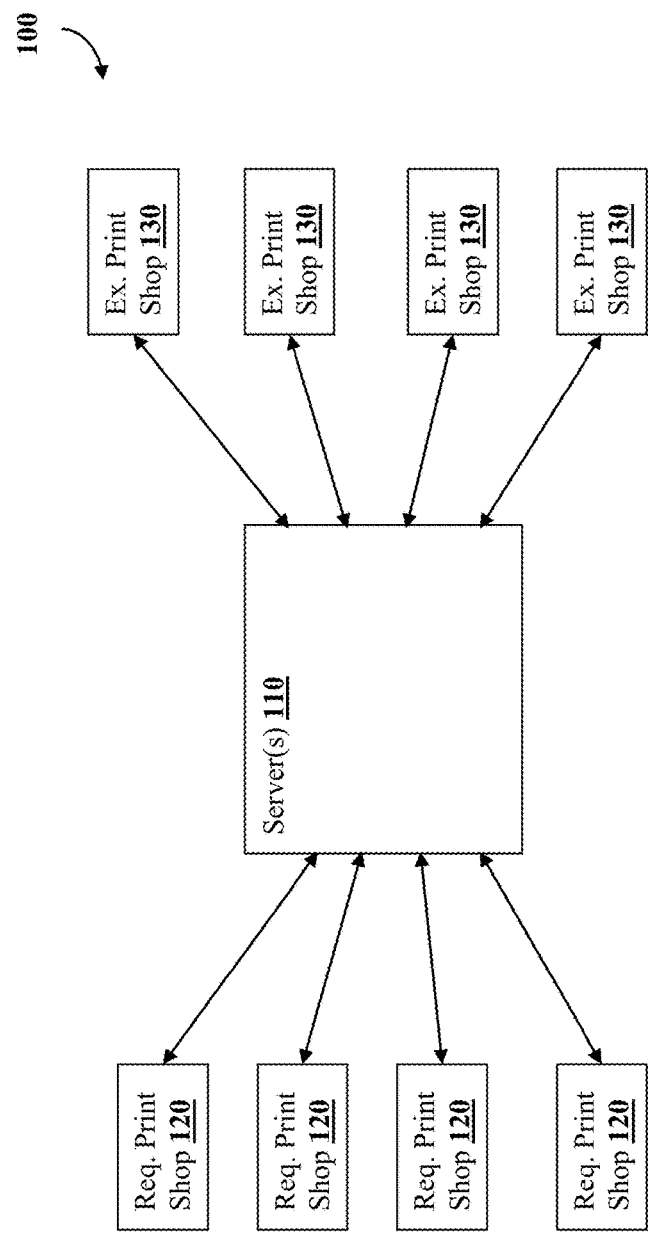
FIG. 1 is an overview of the system according to embodiments of the inventive subject matter.

FIG. 1 provides an overview of the system according to systems and methods of the inventive subject matter. As shown in FIG. 1, the system 100 includes one or more central server(s) 110 communicatively coupled to a plurality of print shops 120,130 via the print shops' computing devices over a data exchange network (e.g., Internet, cellular, etc.) that allows for the exchange of data between the server(s) 110 and each of the print shops 120,130.

Each of the print shops 120, 130 are considered to include one or more computing devices that are capable of exchanging data with server(s) 110. Thus, it is understood that mentions of data exchanges between the server(s) 110 and the print shops 120,130 refer to data exchanges between the server(s) 110 and the respective computing device(s) of the print shops 120,130. The executing print shops 130 are also considered to have one or more printers or other printing output devices to execute a print order to produce a printed output (executed print job). The print shops 120,130 are preferably intermittently networked with the computing devices. One or more requesting print shops 120 may also have one or more printers or other printing output devices.

For the purposes of illustrating the functions and processes of the inventive subject matter, the print shops are shown in FIG. 1 as requesting print shops 120 and executing print shops 130. It is understood that one or more of the requesting print shops 120 can also, in some embodiments, perform some or all of the functions of an executing print shop 130 and vice-versa.

Figure 2:
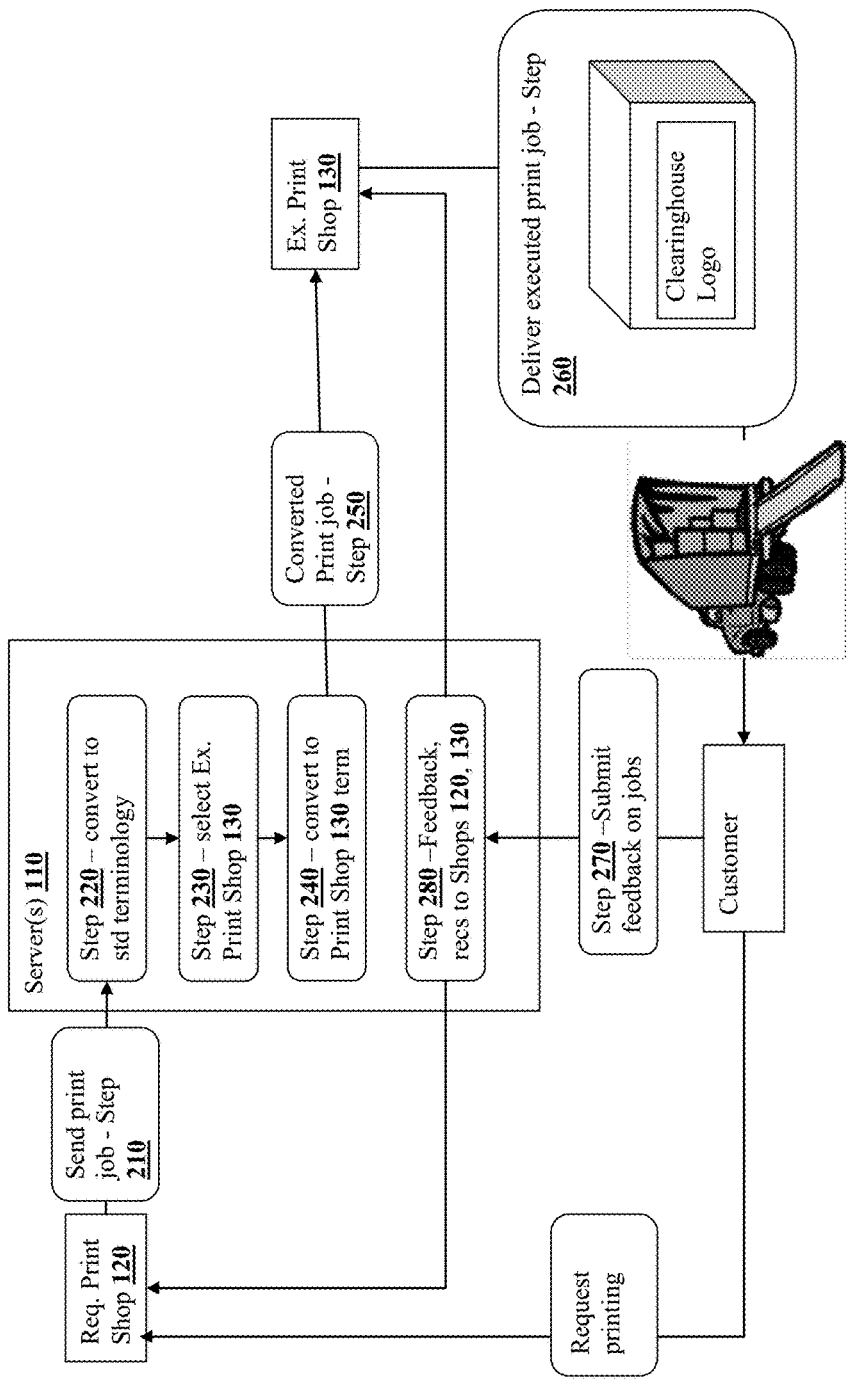
FIG. 2 provides an overview of the workflow associated with the systems and methods of the inventive subject matter.
Figure 3:
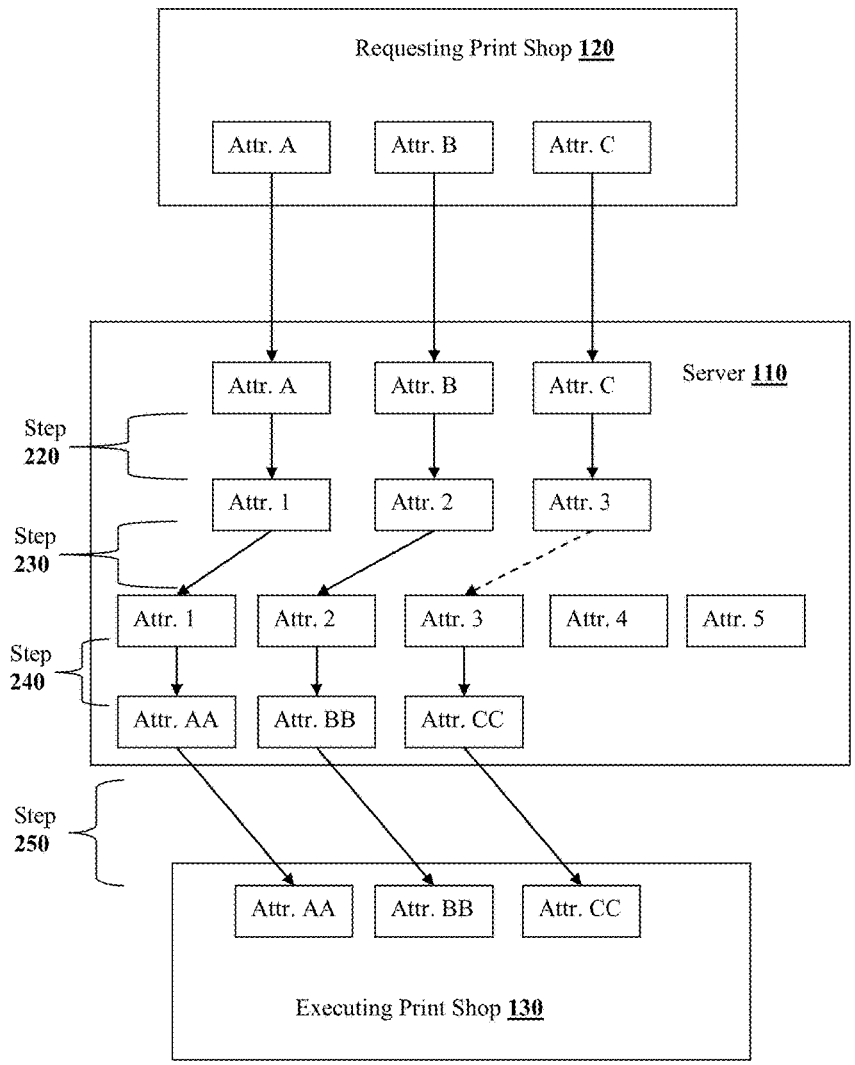
FIG. 3 provides a diagram of multiple steps illustrated in FIG. 2 in greater detail.

FIG. 2 provides a workflow diagram of the execution of the functions and processes according of the inventive subject matter. FIG. 3 provides a zoomed-in diagram of several of the steps illustrated in FIG. 2.

At step 210, a print job associated with a customer is sent from print shop 120 to the central server(s) 110.

A print job includes one or more physical job attributes according to a terminology associated with the particular print shop 120 and one or more logistics job attributes.

The physical job attributes of a print job are the attributes corresponding to the article to be printed. In other words, the physical job attributes of the print job are those attributes that will affect the physical printed product resulting from an execution of the print job. Examples of physical job attributes include attributes such as paper size, paper orientation, paper stock, paper quality, substrate, paper color, ink type, ink colors, printing resolution, etc.

The physical job attributes of the print job generated at print shop 120 and received by central server 110 are in a terminology used by the particular print shop 120, which may or may not be necessarily consistent or shared by other print shops 120,130. For example, for a particular type of job (e.g., printing a pamphlet), a particular print shop may use the terminology "small", "medium" and "large" that do not necessarily correspond to a specific paper size. Likewise, a particular print shop might use terminology to describe a color that is not necessarily be identical to that used by another print shop for that specific color or color variant.

The logistics job attributes of the print job are considered to be those related to the logistics aspects of the print job, including attributes associated with the processes of producing a printed product. Examples of logistics job attributes include a printing process (e.g., digital/litho/other), a delivery address, a delivery deadline, an amount of copies, a cost ceiling, an indicator of minimum executing print shop 130 quality, reliability, or reputation, a geographic location, etc.

In embodiments, the print job can be generated by the computing device at print shop 120 via the entering of the various attributes associated with the print job on-site, such as by a customer or a print shop employee working with a customer physically at the print shop 120.

In embodiments, the print job can be created based on submissions by a customer on a website operated or managed by print shop 120's that allows for a customer to create an order, input the printing attributes or characteristics, upload a file with a document, a sample, an image, or other item to be printed, and input other options related to the order (e.g., desired delivery date, shipping options and information, billing information, copies desired, paper quality, etc.).

At step 220, the central server 110 is programmed to convert one or more of the physical job attribute(s) in the print job to a standard terminology. Standard terminology is considered to be the names, values or characteristics associated with the various physical job attributes according to a standard nomenclature. For example, standard terminology for paper sizes can include standard sizes such as 8.5×11 inches, standard envelopes, etc. Standard terminology for colors can be colors according to standard color profiles, formats or models (CMYK, RGB, etc.). Other standards can include standard paper or cardstocks, fonts, font sizes, etc.

To perform the conversion, the central server 110 uses a mapping scheme created by the requesting print shop 120. The mapping scheme can be stored locally by the central server 110 or in a separate database accessible by the central server 110. Alternatively, the mapping scheme can be stored by the computing device at the requesting print shop 120 and submitted to the central server 110 along with the print job.

The mapping scheme is a correlation of a particular print shop's terminology to the standard terminology. Each of the print shops 120,130 in the system 100 has a corresponding mapping scheme generated by each of the individual print shops. To illustrate, a mapping scheme is explained as corresponding to the print shop 120 that sent the print job. To generate the mapping scheme, the system 100 can provide an interface accessible via the print shop 120's computing device (such as via a website interface or downloadable application). The interface allows the print shop 120 to correlate their particular terminology used for the physical job attributes with a corresponding attribute of the standard terminology. This can be achieved via a selection of one or more attributes according to the standard terminology and allowing the print shop operator to input their individual terminology as correlated to those attributes. Other contemplated user interface tools include selectable drop-down menus of standard terminology attributes that can be added to a correlation with a particular individual terminology being entered. For example, for the print shop that offers "large", "medium" and "small" print sizes, the user creating the mapping can select one or more paper sizes to correspond to each of "large", "medium" and "small." The output of the conversion is the print job in standard terminology.

It should be noted that the attribute mapping does not have to be a one-to-one correlation of attributes. For example, the system 100 allows a user to create a mapping such that an attribute in their shop's terminology corresponds to more than one attribute in standard terminology. For example, a "medium size" attribute created by the print shop can correspond to a height attribute having a particular value (e.g., height: 11 inches) and a width attribute having a particular value (e.g., width, 8 inches) in standard terminology.

FIG. 3 provides a closer illustration of step 220, wherein after receiving the print job in the terminology used by print shop 120 (illustrated in the form of attributes having terminology "A", "B" and "C"), the server 110 then translates it according to the mapping created by print shop 120 to result in attributes "1", "2", and "3", representing the standard terminology used by the system. In the illustrative example of FIG. 3, attributes A and B submitted by shop 120 are considered to be the logistics attributes and attribute C is the physical job attribute.

It should be noted that, in embodiments, one or more of the logistics attributes are submitted by a print shop 120 in the standard terminology due to requirements of the standard terminology protocol or because they are such that no alternative naming is needed or likely to be used by a print shop 120/130. Logistics attributes representing the quantity of an order or a desired date of delivery are example of those that can be submitted in standard terminology by print shop 120. As such, they do not require conversion.

In the example of FIG. 3, attributes A and B are considered to a logistics attribute submitted according to the terminology used by print shop 120 that requires conversion to the standard terminology.

In embodiments, the system 100 can store (either by server 110 or client-side, or both) groupings of mapped attributes corresponding to products that an executing print shop 130 is capable of offering. The grouping can be given a name attribute. If the product has a corresponding name or category attribute in the standard terminology, the creating print shop can similarly map the name attribute according to the print shop's terminology to the standard terminology in the same manner as the mapping of the other attributes is performed. Likewise, a requesting print shop 120 can create a grouping for a product they wish to order with the desired attributes of the product that are mapped as discussed above, which can similarly include a name attribute for the group.

In embodiments, the standard terminology used corresponds to the Job Definition Format ("JDF") protocol and the converted print job is in JDF job format. For example, the standard terminology can include the product intent resources according to Chapter 7 of the JDF specification.

At step 230, the central server 110 selects an executing print shop 130 from the plurality of executing print shops 130 based on one or more of the logistics job attributes. For example, based on an availability to meet a turnaround time, to meet a particular cost estimate for the order, etc.

In embodiments, the central server 110 has a database storing logistics attributes of each of the executing print shops 130, which correspond to the characteristics and capabilities (e.g., capacity, printer capabilities, location, processes used, etc.) of each executing print shop 130. In these embodiments, the central server 110 compares one or more of the logistics job attributes of the print job with those of the print shops 130 to select the print shop 130. In these embodiments, the print shops 130 can submit updated logistics attribute information periodically (e.g., daily, weekly, hourly, etc.) such that the database is kept up-to-date.

FIG. 3 illustrates that, at step 230, the server 110 finds a match in print shop 130 based on logistics attributes 1 and 2 and the attributes corresponding to the shop 130. FIG. 3 also shows that physical job attribute 3 is not used in the matching but corresponds to the physical job attribute 3 of the particular shop 130 (represented by the broken-line arrow). The information provided by shop 130 to enable a match can be in the form of a product offering that includes all of the attributes of a particular product offered by a shop 130.

In other embodiments, the central server 110 can be programmed to select one or more executing print shops 130 based on static attributes such as location or maximum capacity, and then send a request to the print shop 130 including the relevant logistics job attributes of the print job such that the print shop 130 confirms its availability to execute the job according to the logistics job attributes of the print job. Upon receiving a confirmation, the central server 110 then selects the print shop 130. It should be noted that it is contemplated that a print job can be distributed among more than one executing print shop 130 in the same way that a single print shop is selected, whereby the central server 110 is programmed to divide the print job such that it is capable of distribution among several print shops 130 that collectively can meet the demands expressed in the logistics job attributes.

In embodiments of the inventive subject matter, the central server 110 is programmed to, at step 220, convert only the logistics attributes required for the matching at step 230 into the standard terminology. Then, after selecting an executing print shop 130 at step 230, the central server 110 proceeds to convert the physical job attributes from the terminology of the print shop 120 into the standard terminology. This reduces the computing load on the server 110 and the speed of the process by reducing the conversions performed in the event no matching executing print shop 130 is found.

Upon selecting a print shop 130, the central server 110 converts the physical job attributes of the print job from the standard terminology to the terminology used by the print shop 130 at step 240. Each print shop could have its own proprietary terminology, where central server 110 saves a mapping that provides a translation key between at least some of the terms of the standard terminology to the print shop terminology. In preferred embodiments, the server's mapping is generated such that every term of the standard terminology has a mapping that converts that term to a term in a print shop terminology. In other embodiments, the server's mapping is generated such that mappings for some print shops are fully mapped (100% of the standard terms could be translated), and mappings for other print shops are only partially mapped (80% of the standard terms could be translated). In such embodiments, preferably the system performs a compromise mapping.

Exemplary compromise mappings include providing default translations for untranslatable terms, providing an error message for untranslatable terms, or for retrieving user input for untranslatable terms. Exemplary error messages include one or more strings of the exact text of untranslatable terms being provided as an addendum to the print job, such that a human user can resolve the portion of the print job that is untranslatable. Exemplary methods of retrieving user input comprises triggering an alert to a user, for example a text message, email, or a screen-pop up, transmitting at least a portion of the untranslatable term to a user interface accessible to an admin user, and then receiving a translation from the user.

As with the conversion described at step 220, the central server 110 uses the mapping scheme generated by the selected print shop 130 to convert the print job into the terminology that the print shop 130 is familiar with.

As discussed herein, the mapping generated by print shops 120,130 is an association or link of a print shop's attribute and attribute value to a corresponding attribute and attribute value in the standard terminology of the system. Thus, for each mapping, the system 100 stores the association such that when "converting" from the terminology of a print shop to standard terminology, the server 110 retrieves the corresponding saved attribute and attribute value in standard terminology indicated by the association of the attribute in the print shop's terminology and vice versa for converting from standard terminology to a particular print shop's terminology.

As seen in FIG. 3, the server 110 converts attributes 1, 2 and 3 (in standard terminology) to attributes AA, BB, CC, which are attributes according to the terminology used by print shop 130.

The other attributes (4 and 5) shown in FIG. 3 are those that also correspond to the shop 130 but are not related to the print job submitted by the shop 120, so they are not matched or converted as part of the process.

The print job (i.e., converted attributes AA, BB, CC) is then submitted to the print shop 130 for execution at step 250 according to the converted physical job attributes (in FIG. 3, attribute CC) and the logistics job attributes (attributes AA, BB) of the print job. The computer at print shop 130 then receives the order and, based on its internal terminology, can configure networked printers to execute the print job.

Along with the converted print job submitted by the central server 110 to the executing print shop 130, the central server 110 can, in embodiments, include an instruction that the print products resulting from the execution of the print job to be packaged or otherwise labeled for delivery to the customer as having originated from a third party clearinghouse (such as the entity operating the central server 110). This way, the customer receiving the print shop is unaware of the print shop 130 that actually executed the printing (thus preventing that the customer bypasses going to print shop 120 in the future just because in this instance print shop 120 couldn't handle the job). Similarly, the print shop 120 is unable to take credit for print shop 130's work.

At step 260, the printed product of the print job is shipped or otherwise delivered to the requesting customer. At step 270, feedback is received from the customer. The feedback can be provided via the computing device of requesting print shop 120 (through which the customer placed the order originally) or via a feedback interface provided directly by central server 110 (e.g., web-based form).

The feedback is used by the central server 110 to work with the requesting print shop 120 and the executing print shop 130 to fine-tune the mapping schemes of one or both of the print shops 120,130. Thus, at step 280, the central server 110 can provide the customer's feedback and/or recommendations on adjustments to the mapping schemes to improve the accuracy of the correlation between the standard terminology and the individual terminology used by the particular print shop.

In embodiments, the customer feedback is analyzed to determine if it is positive or negative. If it is negative, the central server 110 analyzes the feedback to determine the nature of the deficiency in the print (e.g., the "red" was actually more of an "orange", the stock is wrong, etc). The central server 110 can then categorize the feedback as corresponding to a particular physical job attribute that was incorrect.

To determine whose "fault" it is, the central server 110 can store feedback for the particular print shops 120, 130 and the other print shops with which they interacted in historical print jobs. For each of the print shops 120, 130, the central server 110 analyzes the feedback for that particular physical job attribute. If, for that attribute, one of the print shops 120, 130 has historically had more complaints, then the central server 110 can determine that it is more likely that that print shop has the miscalibrated mapping scheme.

In a further variation of this feedback process, the central server 110 can review the historical feedback for the other shops that have worked in the past with the individual shops 120,130, and based on how often a complaint related to that particular physical attribute was made against those historical other shops, the central server 110 can determine how likely it was that the error or complaint was due to a fault in the mapping scheme of either shop 120, 130.

Figure 4A:
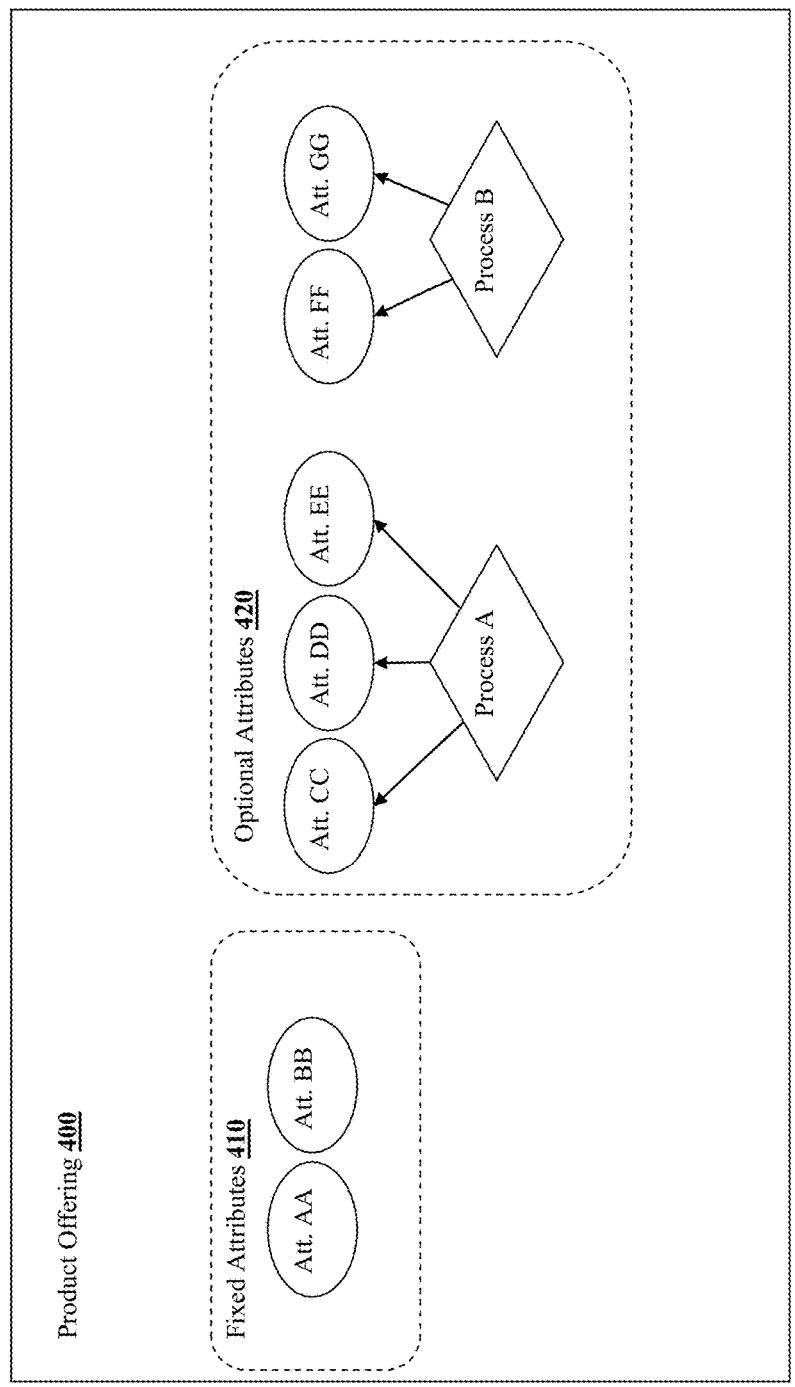
FIG. 4A is a diagrammatic example of a product offering provided to the system by an executing print shop, according to embodiments of the inventive subject matter.

In another embodiment of the inventive subject matter, the matching is performed according to the physical job attributes of a submitted print job. In these embodiments, the overall process at a high level functions similarly to those of the above embodiments. As such, the overall system components of FIG. 1 and the process of FIG. 2 are similarly applicable. The differences in the process between these embodiments and those discussed above are described in further detail as follows:

FIG. 4A provides an illustrative diagrammatic example of the product offering 400, according to these embodiments of the inventive subject matter. The product offering 400 is a collection of attributes that correspond to a particular printing product offered for production by an executing print shop 130. Thus, the product offering 400 can be a collection of attributes representative of a product from the print shop 130's product catalog.

As seen in FIG. 4A, a product offering 400 offered by the executing shops 130 via the server 110 includes a collection of fixed attributes 410 required to be present in a submitted print job to result in a match. These fixed attributes 410 (attributes AA and BB) are physical job attributes that must be present in order for the system 100 to match that particular product offering 400 of the particular executing print shop 130, which corresponds to the minimum physical attributes of the product needed such that the print shop 130 can execute the requested print job. The product offerings 400 can be created via a selection of attributes by the personnel of executing print shop 130. The product offering 400 can be named or labeled by the print shop 130 creating it, to correspond to the real-world product that the product offering 400 represents.

Figure 4B:
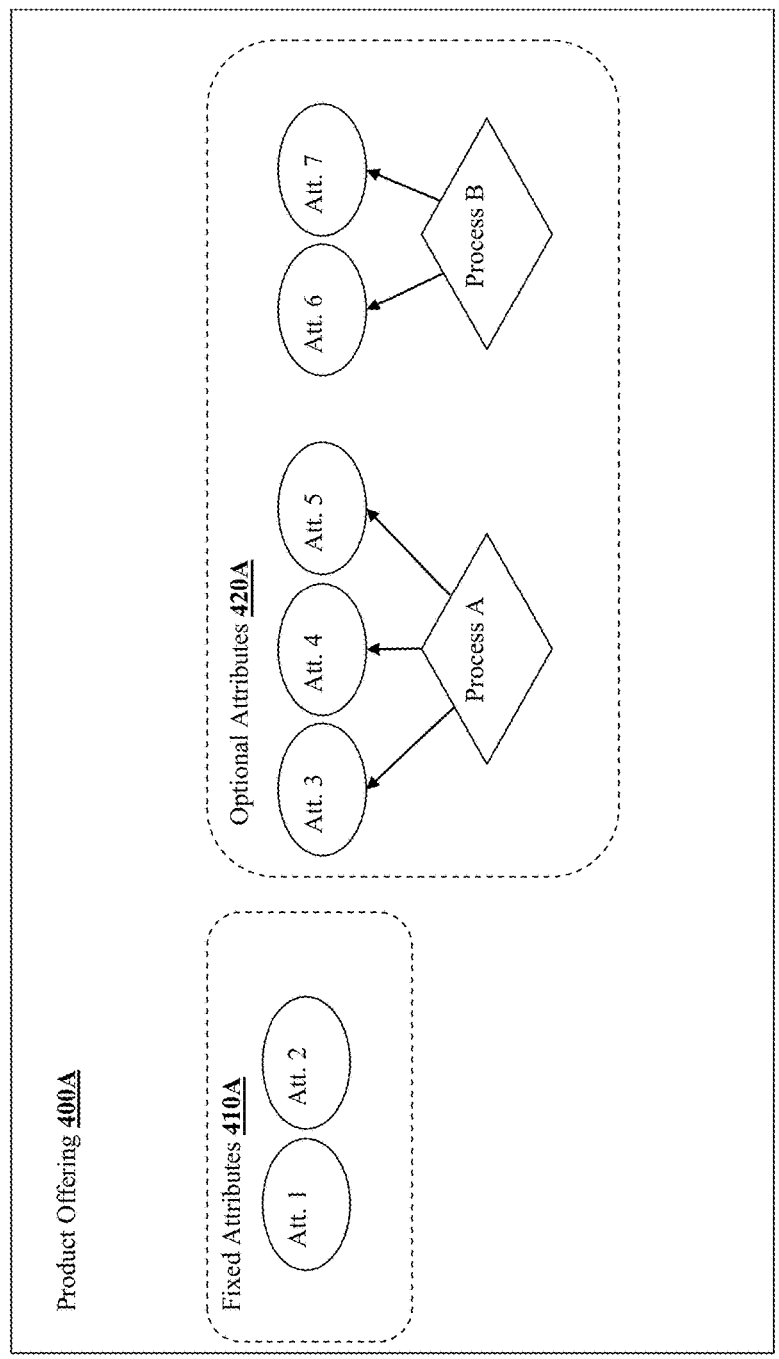
FIG. 4B is a diagrammatic example of the product offering of FIG. 4A converted to standard terminology.

As with the embodiments discussed above, the attributes of the product offering 400 in the example shown in FIG. 4 are in the terminology used by the particular executing print shop 130, which have mapped to the standard terminology used by server 110. In other words, as part of the generation of product offering 400, or at a time prior to the generation of the particular product offering 400, the print shop 130 has mapped the attributes in their particular terminology to the standard terminology used by the system as discussed above. Thus, the server 110, for the purposes of matching the product offering 400 with a print job submitted by a requesting print shop 120, receives the product offering 400, and converts the attributes to the standard terminology according to the mapping created by the print shop 130. The converted product offering 400A (illustrated in FIG. 4B), with the attributes in standard terminology (i.e., attributes 1-7) is stored by the server 110.

The print job may also include optional attributes 420. The optional attributes can include additional physical attributes beyond those that make up the fixed attributes as well as the logistical attributes. It should be noted that in these embodiments, the logistical attributes including those related to processes for producing various types of products, will always be considered to be optional attributes.

In the example illustrated in FIG. 4A, the optional attributes 420 are logistical attributes corresponding to two optional processes ("Process A" and "Process B") that the particular executing print shop 130 has available to carry out a print job for the product offered via product offering 400.

Figure 5:
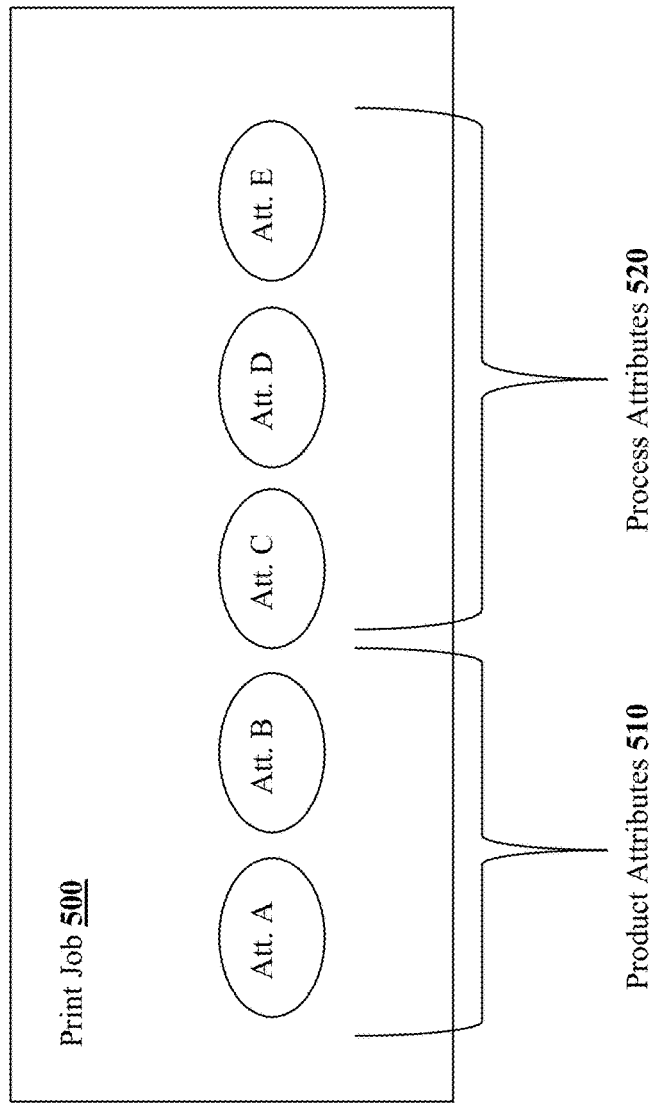
FIG. 5 illustrates a diagram of a print job submitted by a requesting print shop according to the second embodiment of the inventive subject matter.

FIG. 5 illustrates a diagram of a print job 500 submitted by a requesting print shop 120.

As seen in FIG. 5, the print job 500 includes a plurality of attributes that can be categorized as physical job attributes 510 (also referred to as "product attributes") and logistical attributes 520 (also referred to as "process attributes"). It should be noted that the server 110 does not distinguish or categorize the various attributes of print job 500 as fixed or optional. This categorization is performed for the product offerings 400 added to the system by each respective executing print shop 130. The attributes A-E of FIG. 5 are in the terminology used by the particular requesting print shop 120. The print job 500 may also be referred to as a "product intent."

The print job 500 can include a name attribute, whereby the creating user at the requesting print shop 120 can assign a product or marketing name to this print job.

In embodiments, the print job 500 can be saved at the client side computing device or at server 110 such that the user can request additional orders in the future without having to reconstruct the order. As such, via a web-connected interface (e.g., website or downloadable application provided by server 110 for access to the system), a user at requesting print shop 120 can simply submit an order by selecting the product name which brings up the saved order attributes. In embodiments, the interface prompts the user to enter an order amount or confirm a previous order amount for submission to the server 110.

By enabling the product offering 400 and the print job 500 to be assigned names, the server 110 enables a product definition of a product within the system—a mapping of the marketing term or name of the products according to the respective names or terminology used by each requesting print shop 120 and executing print shop 130 to the production criteria of the product as set forth in the respective attributes of the product offerings and the submitted print jobs.

In embodiments where the standard terminology used is the JDF protocol, the server 110 stores a JDF-compatible XML file that enables the mapping of the marketing name to the JDF terminology. The XML file contains only the JDF terms used for the functions of the system 100 within the server 110, which is a subset of all of the JDF terms. As discussed above, a user at print shops 120/130 can map the characteristics according to their respective terminology to the JDF terms via a selection from a list, drop-down menu, etc. By also having a product name attribute with the product offering 400 or print job 500, the user thereby maps the product name to the corresponding JDF terms.

Figure 6:
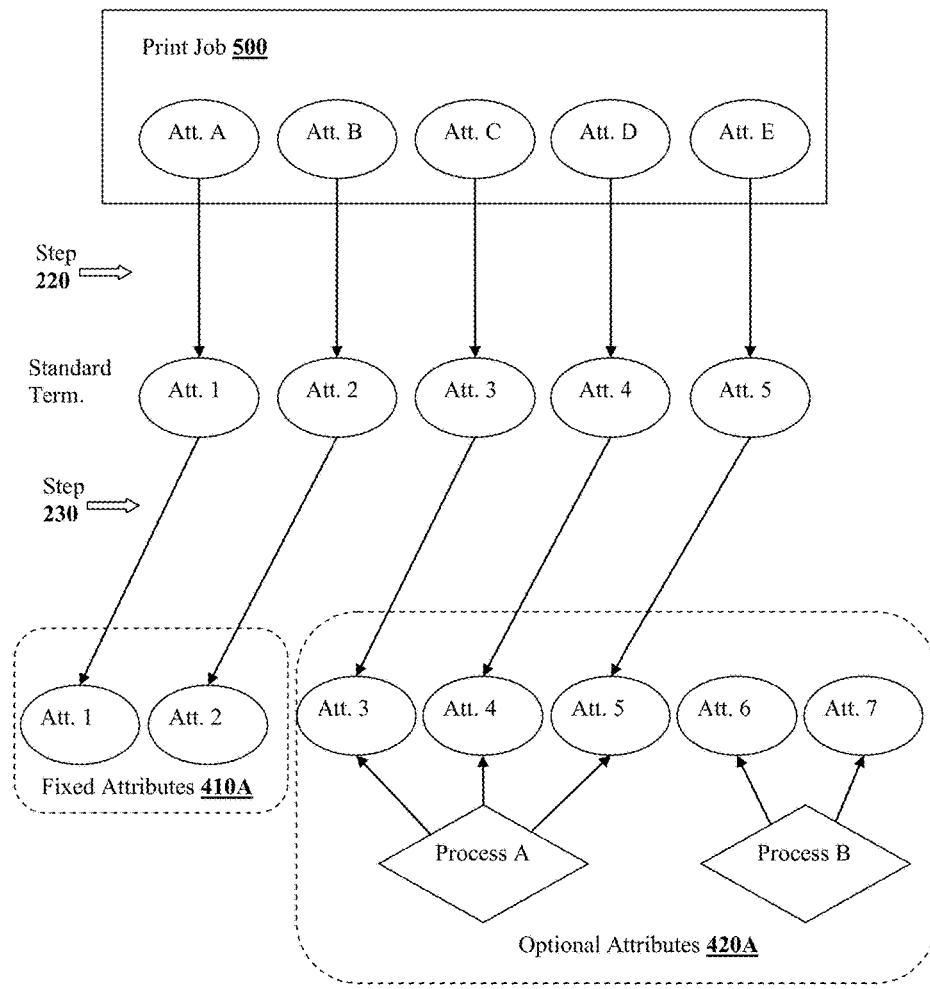
FIG. 6 illustrates the process of selecting an executing print shop according to embodiments of the inventive subject matter.

In these embodiments, the server 110 performs the selection of an executing print shop 130 at step 230 based on matching the attributes of the print job 500 to the respective attributes of the product offerings 400 made available within the system. If any optional attributes are included in the print job, then the server 110 also considers the optional attributes during the matching. FIG. 6 illustrates the process of selecting an executing print shop 130 according to these embodiments of the inventive subject matter.

Similar to the process illustrated in FIG. 3, the server 110 also performs a conversion of the attributes of the print job 500 from the terminology of the requesting print shop 120 to the standard terminology at step 220 in the process illustrated in FIG. 6. The server 110 then selects the executing print shop 130 by matching the converted attributes 1-5 to the attributes of the product offering 400A at step 230 (which, as discussed above, are in the standard terminology). In this example, because the print job 500 also includes optional attributes D and E (converted to attributes 4 and 5), all five attributes must match to select this particular product offering 400A.

Following the selection of the particular product offering 400A, the server 110 converts the matching attributes to the terminology used by the executing print shop 130 to which product offering 400A at step 240 (not illustrated here for clarity) corresponds and sends the order in the shop 130's terminology to the shop for executing at step 250. The server 110 does not convert the non-matching attributes.

In embodiments, the server 110 is programmed to, at step 220, first convert only the product attributes of a print job 500 to standard terminology and then match those to the fixed attributes of the product offerings 400A stored by the server 110. Upon completing this step and finding at least one product offering 400A whose fixed attributes are matched, the server 110 then converts any process attributes included in print job 500. This way, the server 110 first ensures that the fixed attributes of at least one product offering 400A are matched, thus conserving computing resources by not converting the process resources of the print job 500 if no product offerings 400A match. If no matches are found, the server 110 returns a notification message to the requesting print shop 120.

Because the attributes CC, DD and EE of product offering 400A were matched, the process A is used by print shop 130 since the attributes CC, DD, EE were defined as being a part of this process. This may be because the attributes are inherently part of the process or because the particular print shop 130 set this definition as an internal rule. For example, if attribute CC was a threshold amount of an order (e.g., X copies), attribute DD is an attribute associated with a minimum delivery date, and attribute EE is a cost threshold amount, the process A may be a particular production process for the product specified by the fixed attributes that the print shop 130 uses to be able to produce the product within the constraints of the attributes CC, DD, and EE.

If a print job 500 does not include optional attributes, then it indicates that the requesting print shop 120 is not concerned with these attributes and the print shop 130. Thus, in embodiments, the option attributes are disregarded by the system when making a match and are not part of the order submitted to the print shop 130 for execution.

However, in other embodiments, the optional attributes of a product offering 400 (and thus converted product offering 400A) are considered to be "common" attributes of the product. These attributes are not required to be specified by the requesting user in the print job 500 (thus, optional) but the system 100 nevertheless requires that the order be carried out according to at least one of the options of a particular type submitted as optional attributes in the product offering 400. In other words, if a product offering 400 includes two optional processes and a matching print job 500 does not include any optional attributes at all such that neither process in the offering 400 would be selected, the print shop 130 nevertheless must execute the order according to one of the offered processes. This way, the requesting print shop 120 knows that the print job will not be processed according to characteristics or processes that are outside of those selectable or represented by the system 100. To do so, the server 110 can send a message to the print shop 130 along with the translated order indicating that no optional attributes matched and indicating the available processes acceptable according to the system. Alternatively, the server 110 can be programmed to select an alternative by default or via a designated alternative selected by the print shop 130.

It should be noted that, as discussed herein, a match is considered to be a match of attribute and attribute value of two corresponding attributes. Thus, matching of an attribute type (e.g., paper attribute) will still not result in a match if the values of the attributes do not match (paper of 14PT versus paper of 12PT).

Figure 7:
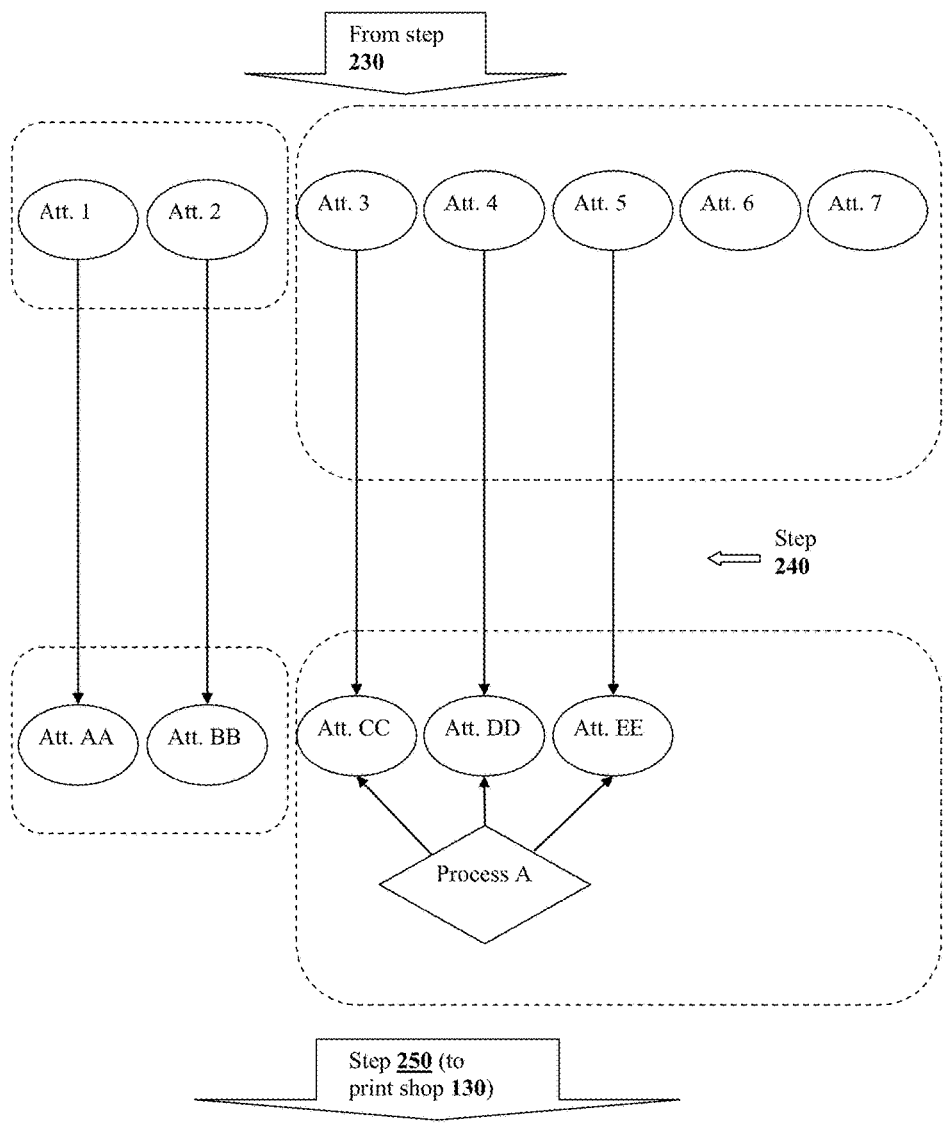
FIG. 7 continues the process started in FIG. 6.

FIG. 7 continues the process started in FIG. 6, illustrating where at step 240 the attributes are converted to the terminology used by the executing print shop 130 that submitted the product offering 400 and sent, as a print order, to the print shop 130 at step 250 for execution.

Figure 8:
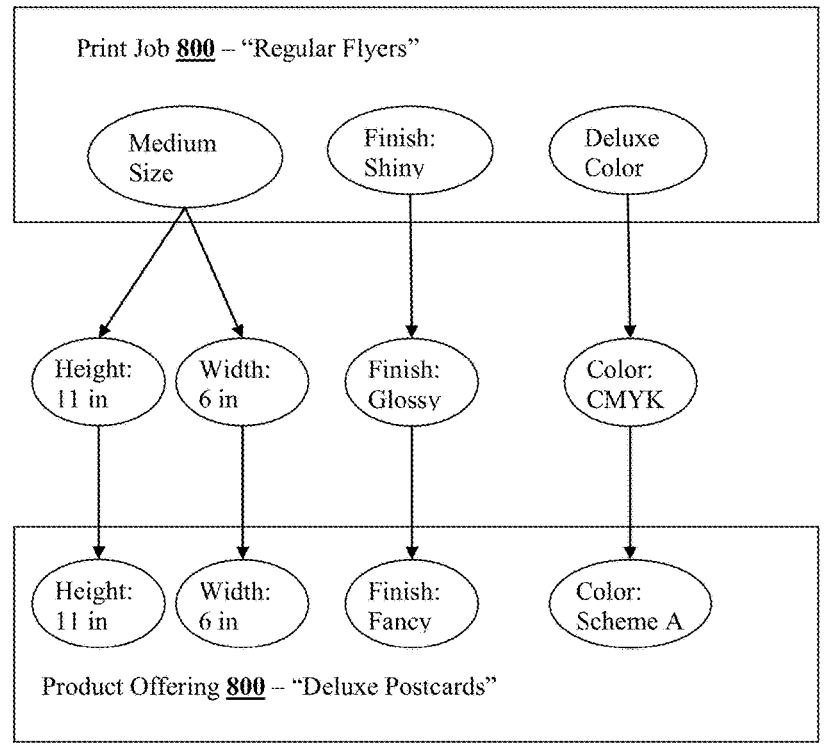
FIG. 8 provides a simplified example illustrating how the inventive subject matter does not require matching product names in order to match and execute a submitted print job.

FIG. 8 provides a simplified example illustrating how the functions of the inventive subject matter do not require matching product names in order to match and execute a submitted print job 500 (labeled as print job 800 for this illustrative example). As seen in FIG. 8, a requesting print shop 120 wishes to order what are, according to his terminology, "Regular Flyers." The print job 800 for Regular Flyers includes attributes according to what print shop 120 considers "Medium Size" having a shiny finish and deluxe color. Based on the mapping provided by print shop 120, the server 110 coverts the attributes of the print job 800 to the standard terminology, having attributes of height (11 inches), width (6 inches), finish (glossy), and color (CMYK) at step 220 as discussed above. The matching process of step 230 as discussed above (not repeated here for simplicity and clarity) results in a match of a product offering 810 (product offering 400, relabeled for this example) that, in the terminology of the executing print shop 130 that submitted it, has attributes of height (11 inches), width (6 inches), finish (Fancy) and color (scheme A). The print job is thus submitted according to the terminology of the executing print shop 130.

Some of the attributes may include a tolerance value whereby a strict match is not required of the values, but instead there must be a match within a tolerance to result in a true match for the attribute. Attributes such as order amount, delivery date, and price can be considered to be tolerance value attributes. For example, a product offering of an executing print shop 130 may specify a particular minimum price attribute for a particular product and of a particular amount. If the print job 500 specifies a maximum price for that job, the server 110 considers the price attribute of the print job 500 to be within the tolerance of the product offering 400 and thus deems it a match. The server 110 can be programmed to set the price for the print job when submitted to the executing print shop 130 as the minimum price set by the print shop 130 in the product offering, thus giving the submitting print shop 120 the most competitive price.

In embodiments, the server 110 is also programmed to determine a match based on logistical factors outside of a product offering 400 such as the geographic location of the print shop 130 relative to the requesting print shop 120, and the time and costs associated with shipping the finished product to the requesting print shop 120.

In these embodiments, the server 110 is communicatively coupled to computing devices (e.g., servers) of one or more third-party shipping and logistics providers. When a match is made as discussed above, the server 110 is programmed to send a request to the third-party shipping and logistics providers to obtain shipping costs and times for the order. The server 110 then adds the resulting costs and time estimates for shipping to the costs and production time for a job provided by matching print shops 130 and selects among the print shops 130 according to the adjusted information. Thus, the selection of the print shop 130 to execute the job is based not only on the print shop's ability to execute a print job for a particular product, but also on factors that may influence the ability to meet the print job requirements that are outside of the particular print shop's control.

In alternative embodiments, the server 110 is programmed to allow a requesting print shop 120 to create an order for a particular product by enabling a user to select the attributes for the job in standard terminology. To do so, the server 110 is programmed to present a website or other client-facing portal, whereby the server 110 provides the attributes available for selection to the user. The attributes can be presented via a list, drop-down selection menu, etc.

In a variation of these embodiments, the server 110 is programmed to provide an instructional application (e.g., a "wizard") that walks the user through the creation of the order. The wizard is programmed to ask the user for inputs that enable the wizard to present attributes for selection in standard terminology, and does so sequentially until the necessary attributes for a particular product or product offering are selected.

As discussed above, the system 100 is able to provide feedback and progress updates to a requesting print shop 120. To do so, the server 110 is programmed to, along with a print order submitted to the executing shop 130, submit instructions executable by computing devices at the executing shop 130 to report as certain events before, during and/or after the production process are completed. FIG. 9 provides an example of the update events. As seen in FIG. 9, many of the update events are optional, whereby a print shop 130 can report these events if they wish to do so. The checked items are required updates that require the print shop 130 to confirm to server 110 upon completion of the event such that server 110 in turn communicates the update to the print shop 120. In embodiments, a print job 500 can include a list of required updates selected by print shop 120 that the shop wishes to be notified upon completion. These are then passed along by the server 110 to the selected executing print shop 130.

Figure 10:
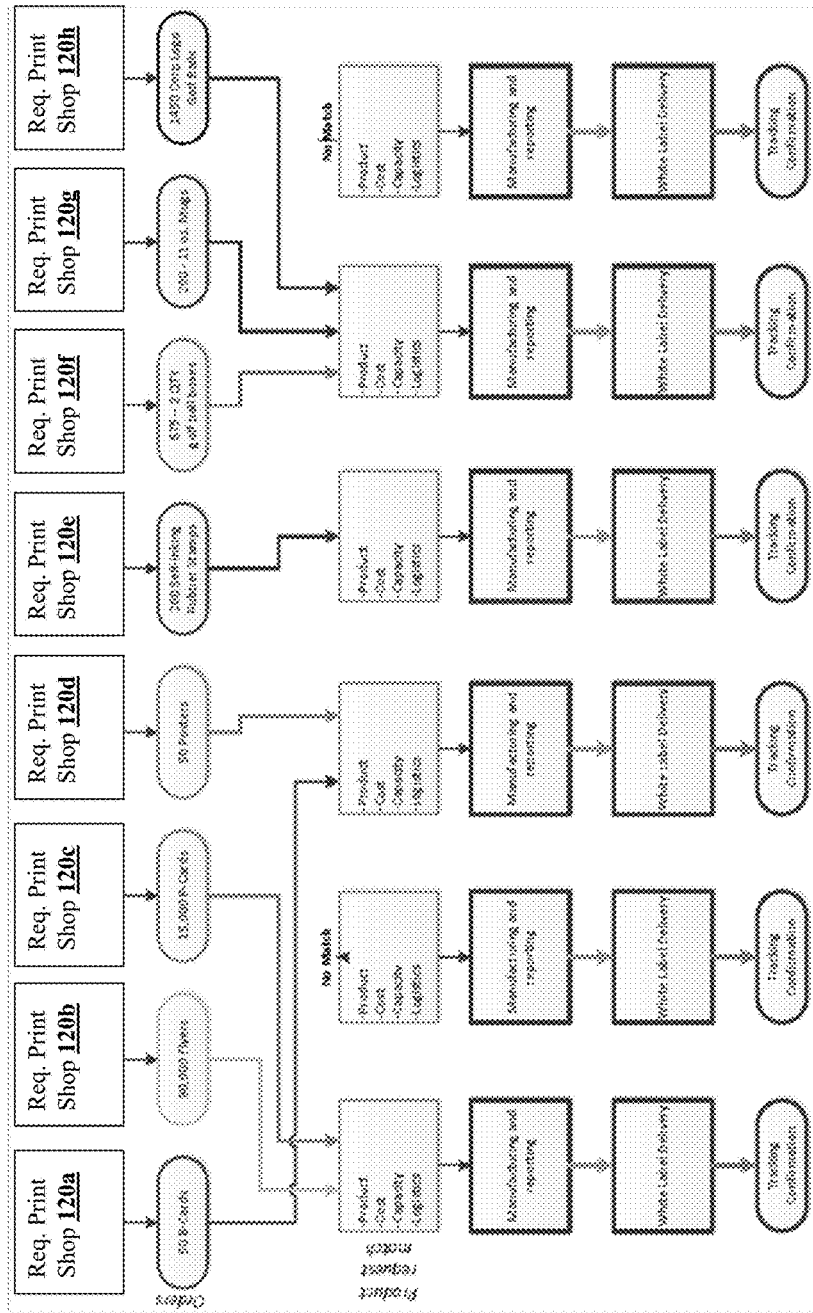
FIG. 10 illustrates the systems and methods of the inventive subject matter as used by a plurality of print shops placing print jobs for execution.

FIG. 10 illustrates the system 100 of the inventive subject matter as used by a plurality print shops 120a-120h placing print jobs for execution. As seen in FIG. 10, each print shop 120 places an order, which is matched according to the processes and methods discussed above to a particular executing print shop 130 (represented by each of the columns). After matching, each print shop 130 that receives print jobs proceeds to execute during the manufacture or reporting stage, and passes the process to delivery. The system can also work with shipping providers to provide tracking confirmation functions to the various requesting print shops 120. Two of the columns have no match, meaning none of the submitted jobs matched the product offerings of those executing print shops.

It is contemplated that the system will also include invoicing functions to generate invoices for executed jobs. The invoices and other information can be stored in server 110, in a database associated with an invoicing function, or in a separate data warehouse that can also be used to store other system data such as the mappings, the standard definition attributes, etc., and be updated periodically according to a schedule to ensure that the data relied upon is current.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of printing, comprising:
   receiving from an originating print shop, a print job requested by a customer, which includes (a) a physical job attribute according to a first terminology, and (b) and a logistics job attribute;
   converting the physical job attribute to a standard terminology according to a self-mapping maintained by the originating print shop;
   using the logistics job attribute to select an executing print shop from among a plurality of available print shops;
   converting the physical job attribute from the standard terminology to a second terminology according to a self-mapping maintained by the executing print shop;
   directing the executing print shop to execute the print job in accordance with the physical and a logistics job attributes, as interpreted according to the self-mapping maintained by the executing print shop;
   sending the executed print job to the customer;
   working with at least one of the originating and executing print shops modify their respective self-mappings according to feedback from the customer;
   analyzing the feedback from the customer to determine a nature of a complaint regarding the delivered print job;
   consulting a database of historical print jobs for each of the originating and the executing print shops, including customer feedback associated with those historical print jobs;
   identifying a commonality of the nature of the complaint for at least one of the originating print shops and the executing print shops based on their respective historical print jobs;
   providing an indication that the self-mapping of one or more of the originating and executing print shops needs to be modified based on the commonality of the nature of the complaint for the respective print shop;
   for each of the historical print jobs, identifying another print shop that worked with the respective originating and executing print shops;
   consulting the database to locate other historical print jobs for each of the another print shops, the other historical print jobs including customer feedback associated with those other historical print jobs;
   identifying a commonality of the nature of the complaint for at least one of the another print shops and the respective originating and executing print shop based on their respective historical print jobs and the respective other historical print jobs; and
   providing the indication the self-mapping of one or more of the originating and executing print shops needs to be modified based on the commonality of the nature of the complaint for the respective originating or executing print shop and the other print shops.

2. The method of claim 1, wherein the step of sending the executed print job to the customer further comprises including identification of a clearinghouse on packaging for the executed print job, the clearinghouse being an entity other than the originating and executing print shops.

3. The method of claim 2, further comprising excluding from the packaging, both identification of the originating print shop and identification of the executing print shop.

4. The method of claim 1, wherein the standard terminology is according to a JDF format.

5. The method of claim 1, further comprising:
   prior to converting, querying the selected print shop for confirmation of capability to execute the job, the query including the logistics job attribute;
   receiving a confirmation from the selected print shop; and
   in response to receiving the confirmation, undertaking the step of directing the executing print shop to execute the print job.

6. The method of claim 1, further comprising:
   providing a self-mapping interface configured to receive the first terminology from the originating print shop; and
   receiving a user selection of a mapping of the standard terminology to the first terminology.

7. The method of claim 6, further wherein the self-mapping interface comprises (a) a field allowing entry of the first terminology and (b) a drop-down menu allowing for the selection of the standard terminology, the standard terminology comprising one or more industry-standard terminologies for the particular physical job attribute.

* * * * *